March 11, 1947.    N. B. SMITH    2,417,091
METAL WORKING MACHINE
Original Filed Aug. 8, 1941    2 Sheets-Sheet 1

Inventor
NEVIN B. SMITH

By Strauch & Hoffman
Attorneys

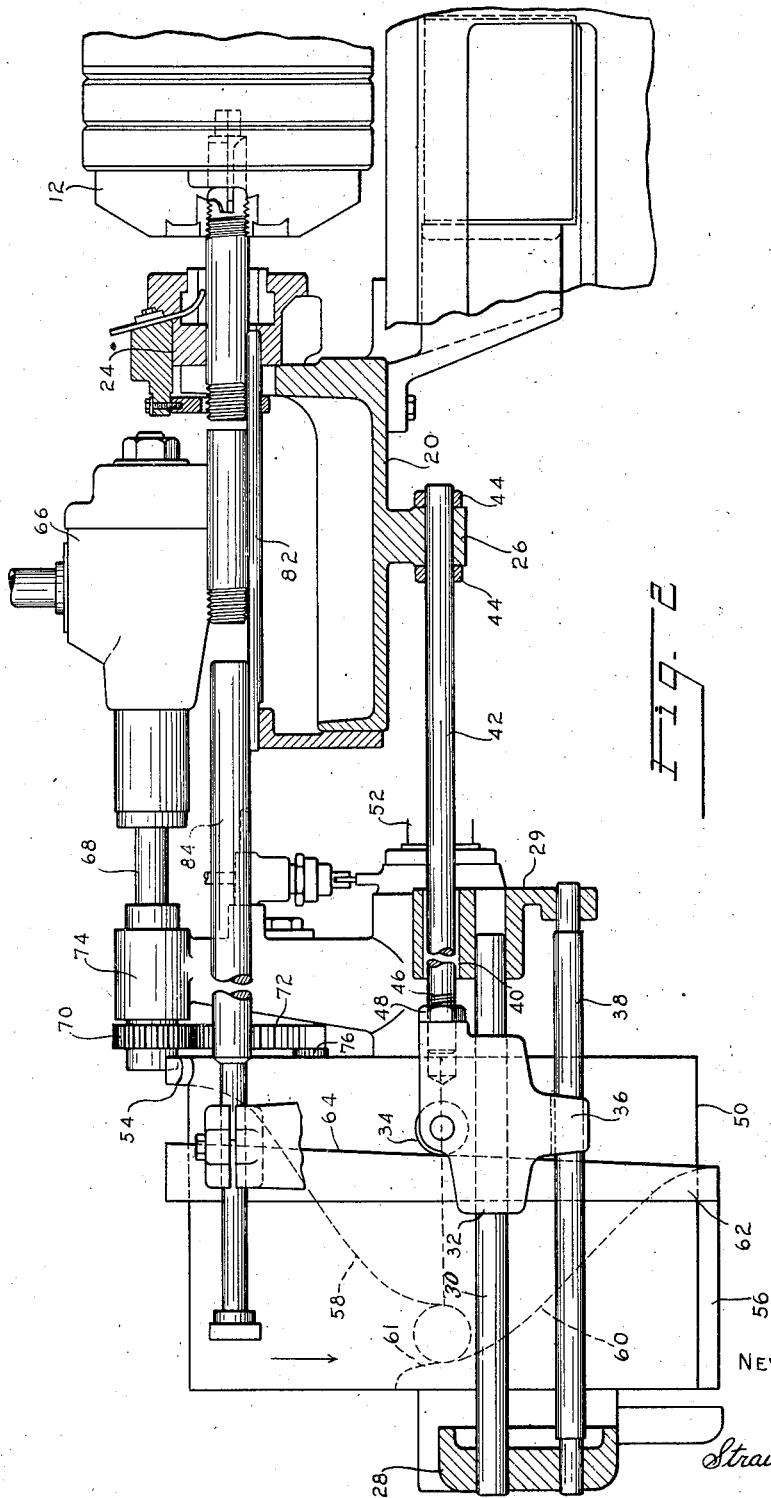

Patented Mar. 11, 1947

2,417,091

UNITED STATES PATENT OFFICE 2,417,091

METAL WORKING MACHINE

Nevin B. Smith, Hamburg, Pa., assignor to Landis Machine Company, Waynesboro, Pa., a corporation of Pennsylvania Original application August 8, 1941, Serial No. 406,049. Divided and this application October 21, 1944, Serial No. 559,798

13 Claims. (Cl. 10—91)

This invention relates to metal working machines of either the single or multiple unit type and more particularly to a novel operating mechanism for the work holders of such machines to automatically retract, advance and feed the work piece to the work forming unit. The subject matter of the instant application constitutes a division of the disclosure contained in my pending application for patent Serial No. 406,-049 filed August 8, 1941, now Patent No. 2,360,-906, dated October 24, 1944.

Generically considered, it is the aim and purpose of the present invention to provide a simple and positively operating mechanism for controlling the movements of the work holder relative to the work forming unit, which is particularly applicable to machines of that class in which the rate of feeding movement of the work-piece to said unit determines the physical characteristics of the work performed by said unit on the work-piece, such as machines for screw threading the ends of pipes or nipples.

To the above end, it is the primary object of my invention to provide power driven means for reciprocating a work holder relative to the work forming unit and which embodies a control member having a plurality of elements operable in sequential order to impart rapid retracting and advancing movements to the work holder, followed by a relatively slow work feeding movement of the holder with respect to the work forming unit.

In the application of the invention to a multiple unit type machine it is a further object thereof to provide a common control member for reciprocating the work holders in timed relation to each other which insures exactly the same extent of feeding movement of the work-pieces to the work forming units by each of said holders.

It is a further object of the invention in a preferred embodiment thereof to provide slidably mounted members, each operatively connected to one of the work holders, and a common power driven control member rotatably mounted between said members with its axis parallel with the path of reciprocating motion of the work holders and having means peripherally formed thereon to sequentially coact with the respective slide members and reciprocate the work holders in timed relation with each other.

Still another detail object of the invention is to provide means for adjustably connecting the work holder with the slide member, whereby the extent of effective operation of the work forming means on the work-piece in the feeding movement of said holder may be predetermined and limited.

An additional object of the invention is to provide the common control member for the reciprocatory work holders with additional means for actuating an operating member for a work transfer device in timed relation to the retracting movement of one of the work holders and the feeding movement of the other work holder.

In general, my present invention provides a work holder operating mechanism for metal working machines, as above characterized, in the operation of which lost motion is reduced to a minimum, resulting in more positive operation of the work holders with greater accuracy of the formed work-pieces than is possible in the use of prior art mechanisms of this kind, together with the material simplification thereof by the use of a comparatively small number of coacting parts of simple and rugged structural form, thus reducing production costs to a minimum.

With the above and other objects in view, the present invention comprises the improved metal working machine and the construction and relative arrangement of its several parts, as will be hereinafter more fully described, illustrated in the accompanying drawings and subsequently incorporated in the subjoined claims.

In the drawings, wherein I have disclosed one simple and practical embodiment of the invention and in which similar reference characters designate corresponding parts throughout the several views:

Figure 2 is a vertical sectional view taken substantially on the line 2—2 of Figure 1.

Figure 1:
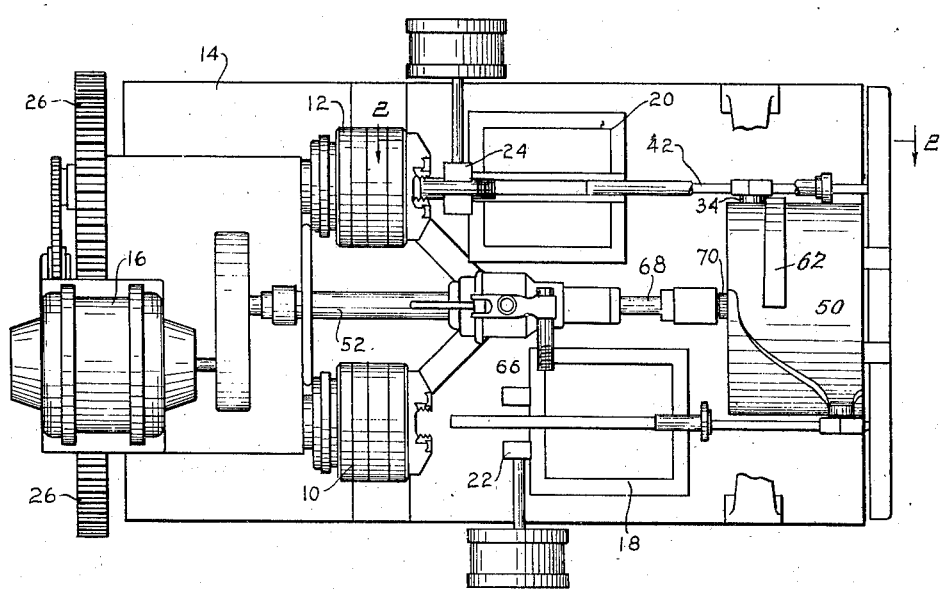
Figure 1 is a top plan view of a multiple unit metal working machine having one embodiment of the present invention applied thereto, certain of the parts being omitted in the interest of greater clarity.

Referring in greater detail to the drawings, for the purpose of illustrating one practical application of the present invention, in Figure 1 thereof I have shown a multiple unit type of metal working machine, in which the transversely spaced apart die heads or other work forming units 10 and 12, respectively, are suitably mounted upon the machine frame 14 to rotate about parallel axes and are operatively connected with and driven by the motor 16 at relatively high speed.

Associated with each of the work forming units and slidably mounted on the machine frame is a reciprocatory carriage, 18 and 20 respectively. Each of these carriages at the end thereof opposed to the work forming unit is provided with a work holding and releasing device, generally indicated at 22 and 24 respectively, for rigidly clamping or holding a work-piece such as a pipe or nipple in coaxial relation with the associated work forming unit. The means for operating the work holding devices in timed relation to the reciprocatory motion of the respective carriages to hold and to release the work-piece constitutes no essential part of the present invention and, being fully described in my co-pending application above identified, will not be herein further described in detail.

Each carriage 18 and 20 is centrally formed with a depending apertured lug, as indicated at 26 in Figure 2 of the drawings, and with these lugs the novel mechanism of the present invention for imparting controlled retracting, advancing and feeding movements to the respective work holders 22 and 24, relative to the work forming units 10 and 12, is connected. This mechanism will now be described with particular reference to Figure 2 of the drawings.

Between the suitably spaced frame members 28 and 29 respectively, the horizontal supporting rod 30 is fixed and upon this rod a slide member 32 is mounted. This member carries a cam engaging roller 34 and is formed with a depending bifurcated lug 36 which straddles a second rod 38 parallel with the rod 30 and also fixed at its ends in the frame members 28 and 29.

The frame member 29 is provided with an opening 40 through which the connecting rod 42 is movable. This rod at one of its ends is rotatably journalled in the lug 26 on one of the work carriages and is held against axial movement relative thereto by means of suitable collars 44 fixed to said rod. The other end of the rod 42 is threaded as at 46 and adjustably connected with the slide member 32, said rod being secured in its adjusted position by the lock nut 48. It will be understood that a similar slide member 32 is mounted and connected to the other work carriage in the manner above described, as shown in Figure 1 of the drawings. It will be noted that the vertical plane of each slide member and the connecting rod 42 is substantially coincident with the axial center of one of the work forming units 10 or 12. Therefore, as the rods 38 effectively preclude any angular turning movement of the slide members 32 on the guide rods 30, in the movement of said slide members the holders 22 and 24 and the work-pieces therein will be reciprocated in accurate coaxial alignment with the respective work forming units.

In order to insure exactly the same extent of reciprocatory motion of the work holders in each phase thereof, I provide a common power driven control member for actuating the slide members 32. As herein shown, this control member is preferably in the form of a cylindrical drum 50 rotatably mounted between the slide members 32 and driven from the shaft 52 connected with the drive spindle of one of the units 10 or 12, through suitable reduction gearing whereby said drum will be driven at a desired predetermined low speed relative to the work forming units. For a further detailed description of this speed-reducing drive means for the control drum, reference may be had to my pending application.

Upon the external periphery of the drum 50 and on the same side of its axis, cam segments 54 and 56 are formed. These segments have camming surfaces 58 and 60 respectively, obliquely inclined with respect to the drum axis and in relatively opposite directions. At the point of nearest approach of these surfaces at one end of the drum, the cam surface 60 is formed with the guide extension 61 for the slide rollers 34. At the other end of the cam surface 60 the segment 56 joins one end of a circumferential rib or flange 62 on the periphery of the drum 50 extending through substantially one hundred and eighty degrees and terminating at its other end in laterally spaced relation from one end of the cam segment 54. This cam segment or flange 62 is provided with the cam face 64 to coact with the slide rollers 34.

It will be evident that in the continuous rotation of the drum 50 in the direction indicated by the arrow in Figure 2 the cam segments of the control drum will sequentially coact in immediate succession with the rollers 34 of the two slide members 32 to effect a linear sliding movement of said members on the rods 30, which is transmitted through the rods 42 to the respective reciprocatory carriages and the work holders thereon. In the present instance, I have shown the units 10 and 12 in the form of screw threading die heads, and it will be noted that due to the relatively sharp inclination of the camming surfaces 58 and 60, in the coaction of the surface 58 with the roller 34 of each slide member, the connected work holder will be rapidly retracted. After the work-piece has been secured in the holder in the manner described in my co-pending application, the work holder then is rapidly advanced to threading position by the coaction of cam surface 60 with the roller 34, which is immediately followed by the engagement of said roller with the cam surface 64 which then imparts a relatively slow feeding movement to the work-piece, after which the work holder is again retracted by the cam surface 58. It will thus be apparent that the rate of rotation of the drum 50 relative to the work forming units or die heads 10 and 12 and the rise of the cam surface 64 determines the lead of the thread being cut on the work piece by said die heads. By the provision of a common cam means accurately controlling the different phases of reciprocatory motion of the work holders, uniformity in the length and in the lead of the screw threads will be obtained. It will be noted that the lines of thrust of the several cam segments against the slide rollers 34 are located in a common horizontal plane which is coincident with the axis of the control drum 50. The slide operating thrusts of the cam segments are thus most effectively applied to overcome frictional forces tending to resist the reciprocatory motion of the work holder carriages. Therefore, in the operation of the mechanism a minimum of additional load is imposed upon the motor 16.

Between the two carriages 18 and 20, a work transfer device and its operating mechanism is mounted in the manner disclosed in my co-pending application. This transfer device, as generally indicated herein by the numeral 66, is operated by the drive shaft 68 having a gear 70 fixed to one end thereof in mesh with the gear segment 72 suitably mounted for oscillating motion upon an upwardly extending bearing arm 74 for the shaft 68 carried by the frame member 29.

Figure 3:
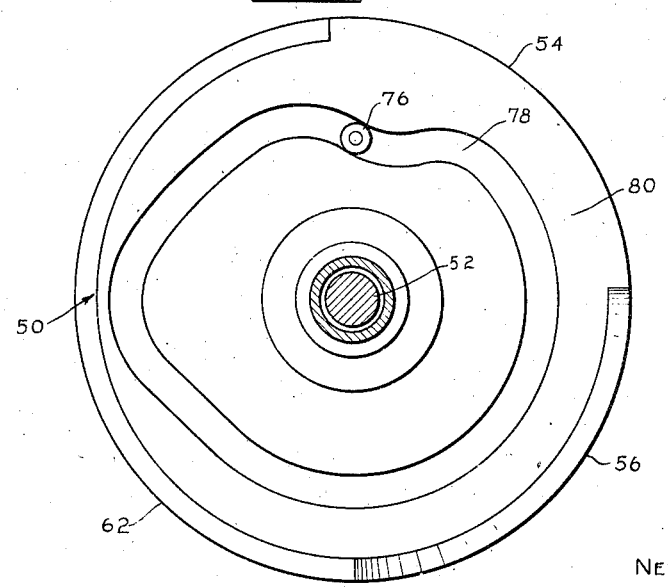
Figure 3 is an end elevation of the control drum, certain parts being shown in section and illustrating the means for actuating the operating mechanism of the work transfer device.

As shown more clearly in Figure 3 of the drawings the gear segment 72 carries a roller 76 engaged in the cam track 78 formed in the end wall 60 of the control drum 50. In accordance with the conformation of the cam track 78, in the rotation of the drum 50 the operating gear segment 72 for the transfer device is actuated when the work carriage 18 and holder 22 are in retracted position to transfer a finished workpiece therefrom and after turning the same end for end, position said work-piece upon supporting means indicated at 82 on the carriage 20 during the slow work feeding movement of said carriage. In the subsequent retracting movement of the carriage 20, a stationary push rod 84 engages the transferred piece and moves the same into the holder 24 as it expels or discharges the finished work-piece therefrom.

A complete cycle of operation of the machine as above described is as follows:

When the forward threading movement of the carriage 18 is completed, the die head 10 is opened to release the work-piece. The carriage is then retracted and during the retracting movement the holder 22 thereon is automatically opened to release the unfinished work-piece therefrom and, in the continued movement of the carriage, said work-piece is deposited upon a stationary support while a new work piece is arranged in position to be secured in the holder 22, as described in my co-pending application. The retracting movement of carriage 18 also automatically controls the operation of suitable trip mechanism (not shown) to close the die head 10.

During the retracting movement of carriage 18, gearing 72 and 70 has operated the transfer device 66 and, as the slide roller 34 moves from the retracting surface 58 to contact with the cam surface 60, said transfer device picks up the unfinished work-piece from the stationary support. During the advancing movement of carriage 18, the transfer device 66 is operated to turn the work-piece end for end and position the same above the supporting means 82 on the carriage 20. During this operation, the carriage 20 is being slowly moved forwardly by the cam segment 62 and the work piece in the holder 24 is being finished in the die head 12. During this operation the unfinished work-piece is released by the transfer device and deposited on the support 82. The die head 12 is then opened, and as carriage 20 is retracted, the operation of the transfer device 66 is reversed while the carriage 18 is advancing to threading position and, upon completion of the threading operation in the die head 10, picks up and transfers the semi-finished work-piece in the manner above explained.

This cycle of operation is repeated in a rapid and efficient manner to accurately thread the opposite ends of the pipe nipples or work-pieces.

From the foregoing description, the construction, manner of operation and several advantages of the present invention will be clearly understood. It will be particularly noted, that by the provision of a common power driven control cam for the two relatively reciprocating work holders, the several phases of the reciprocating motion thereof are very accurately controlled and closely co-ordinated whereby lost motion in the operation of the mechanism is reduced to a minimum. It will further be seen that my improved work holder operating mechanism will function in a positive and reliable manner to accurately produce a threaded end section on the pipe or nipple of a desired predetermined length and having a predetermined thread lead. The mounting and arrangement of the common control drum or cam for the carriage operating slides 32 between said slide members provides a desirably compact, space conserving mounting of the several cooperating elements on the machine frame. Since these cooperating elements are of simple and rugged structural form it will be evident that low initial product cost is realized, while maintenance expense will be reduced to a minimum.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine having two parallel work forming means; work feeding and retracting devices individual to the respective forming means, means for reciprocating said devices in timed relation to each other including relatively movable members each connected with one of said devices, and a common power driven means coacting with said members at relatively different times and constructed to impart rapid retracting and advancing movement to the respective devices followed by a relatively slow work feeding movement of said devices with respect to the work forming means.

2. The combination defined in claim 1, in which said power driven means comprises a single control member operatively mounted between said relatively movable members.

3. The combination defined in claim 1, in which said power driven means comprises a single cylindrical control member rotatably mounted between said relatively movable members and having peripheral means coacting with said members.

4. In a machine having two parallel work forming means; work feeding and retracting devices individual to the respective forming means, means for reciprocating said devices in timed relation to each other including members individual to and operatively connected with the respective devices, means mounting said members for relative linear movement, and a power driven control cam rotatably mounted between and coacting with said members to impart rapid retracting and advancing movements to the respective devices followed by a relatively slow work feeding movement of said devices with respect to the work forming means.

5. The combination defined in claim 4, in which the lines of thrust of the control cam on said linearly movable members lie in a common horizontal plane which includes the axis of said cam.

6. The combination defined in claim 4, in which said control cam is continuously driven in one direction and is provided with peripheral cam members sequentially coacting with said linearly movable members and each controlling one of said movements of the work feeding and retracting devices.

7. In a machine having two parallel work forming means; work feeding and retracting devices individual to the respective forming means, means for reciprocating said devices in timed relation to each other including members individual to and operatively connected with the respective devices, means mounting said members for relative linear movement, and a power driven cam rotatably mounted between said members having peripheral cam faces obliquely inclined in relatively opposite directions to coact with said members and respectively rapidly retract and advance said devices, said cam also having a cam face extending circumferentially between said obliquely inclined cam faces and coacting with said members to impart a relatively slow work feeding movement to said devices with respect to the work forming means.

8. In a machine having two parallel work forming means; work feeding and retracting devices individual to the respective forming means, means for transferring a work piece from one of said feeding and retracting devices to the other, means for reciprocating said devices in timed relation to each other including relatively movable members individual to and operatively connected with the respective devices, cylindrical control member rotatably mounted between said members and having peripheral means sequentially coacting with the respective members to impart rapid retracting and advancing movements to the respective devices followed by a relatively slow work feeding movement of said devices with respect to the work forming means, and said control member having an end wall provided with means coacting with an operating member for said work transferring means to actuate the latter in timed relation with the retracting movement of one of said devices and the work feeding movement of the other device.

9. In a machine having work forming means and a reciprocable work holder, means for reciprocating said work holder including a slide member mounted for reciprocating movement in spaced parallel relation to the path of movement of the work holder, a rigid connecting rod between said work holder and slide member, and a power driven control member provided with spaced parts successively contacting a part on said slide member in coaxial alignment with said connecting rod to reciprocate said slide member in the movement of said control member in one direction.

10. The combination defined in claim 9, in which said control member is mounted to rotate about an axis parallel to the path of reciprocation of the work holder.

11. The combination defined in claim 9, in which said control member comprises a plurality of cams sequentially coacting with said slidable member.

12. The combination defined in claim 9, in which the connection between the work holder and slidable member comprises adjustable means for predetermining and limiting effective operation of the work forming means on the work piece in the work feeding movement of the work holder.

13. In a machine having work forming means and a reciprocable work feeding and retracting device associated therewith, a slidably mounted member operatively connected to said device, and a rotatably mounted power driven cam having peripheral cam faces obliquely inclined in relatively opposite direction to successively coact with said member and respectively rapidly retract and advance said device, said cam also having a cam face extending circumferentially between said obliquely inclined cam faces and coacting with said member to impart a relatively slow work feeding movement to said device with respect to the work forming means.

NEVIN B. SMITH.

REFERENCES CITED

The following references are of record in the file of this patent:

UNITED STATES PATENTS

| Number | Name | Date |
| --- | --- | --- |
| 1,796,352 | Watson | Mar. 17, 1931 |
| 1,560,487 | Shafer | Nov. 3, 1925 |